L. H. RAILLERE.
BROILER.
APPLICATION FILED JAN. 11, 1913.

1,093,883.

Patented Apr. 21, 1914.

WITNESSES
Harry King.
John Murtagh.

INVENTOR
LOUIS HENRY RAILLERE
by
Attorneys

UNITED STATES PATENT OFFICE.

LOUIS HENRY RAILLERE, OF NEW YORK, N. Y.

BROILER.

1,093,883.   Specification of Letters Patent.   Patented Apr. 21, 1914.

Original application filed March 29, 1911, Serial No. 617,686. Divided and this application filed January 11, 1913. Serial No. 741,420.

*To all whom it may concern:*

Be it known that I, LOUIS HENRY RAILLERE, a citizen of the Republic of France, residing in New York, in the State of New York, have invented certain new and useful Improvements in Broilers, of which the following is a specification.

This invention relates to broilers, and has for its object to provide an improved broiler-spit, which is specially adapted for fowl or other kinds of meat subject to injury by being pierced by spits of the kind heretofore used.

The invention is a division of my former application, Serial Number 617,686, filed March 29th, 1911.

The improved spit comprises members inclosing and supporting but not piercing the meat to be roasted, said members being employed in conjunction with means for rotatably supporting them in juxtaposition to the broiler-fire.

Figure 1:
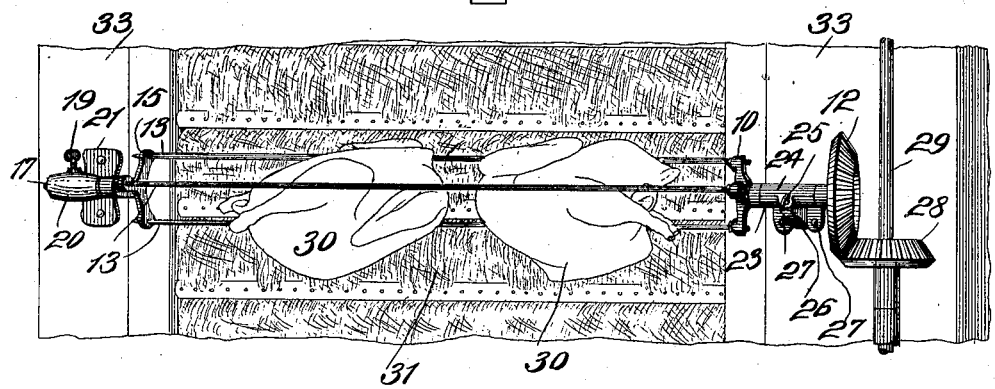
Figure 2:
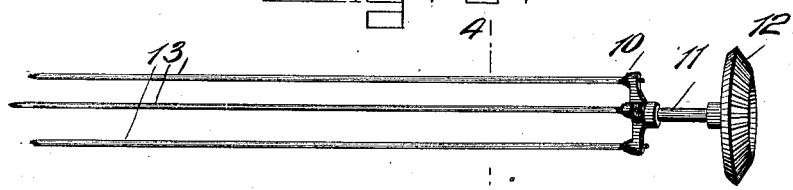
Figure 3:
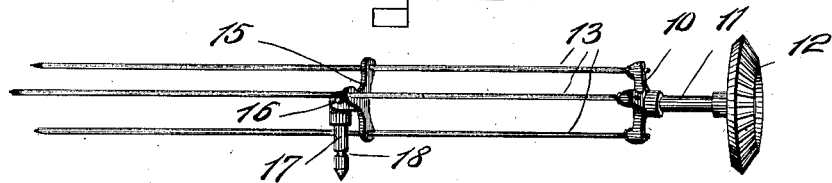
Figure 4:

In the accompanying drawing, Figure 1 is a perspective view of a spit embodying the invention, showing the spit, with meat therein, in front of the broiler-fire, Fig. 2 is a perspective view of the spit removed from the range, Fig. 3 is a similar view showing a supporting end-member applied to the bars of the spit, and Fig. 4 is a section across the bars of the spit, on line 4—4 Fig. 2.

Similar reference numerals indicate corresponding parts throughout the figures.

Referring to the drawing, the spit shown therein comprises a holding-member or head 10 secured to a shaft 11 to which a bevel gear 12 is in turn fixed. The head 10 carries three supporting-members or bars 13, spaced apart in triangular fashion as indicated in Fig. 4, the bars 13 being arranged sufficient distance from each other to support between them the piece of meat to be broiled, without piercing the meat. The bars 13 engage a movable closing-head 15, which is pivoted at 16 to a trunnion 17, which trunnion is provided with an annular recess or groove 18 adapted to be engaged by a screw 19 so as to guide the spit during rotation and prevent its movement out of the support or bearing 20. The trunnion 17 is pivoted in order to enable its ready insertion into the bearing 20. The bearing 20 is supported by a bracket 21, which is in turn secured by screws or otherwise to the frame of the range 33. The shaft 11 is supported by a bearing 23 provided with a cap 24 removable by releasing a thumbscrew 25, which bearing 23 is supported by a bracket 26 secured by screws 27. The bevel-gear 12 is engaged by a bevel-gear 28 secured to a vertical shaft 29 rotated by suitable power. Rotation of the shaft 29 causes the gear-wheel 28 to turn, which in turn rotates the bevel-gear 12, and this causes the meat 30 upon the spit to be roasted, by rotating the same in front of the broiler-fire 31.

The spit is shown of one size, but other sizes may be used, and readily applied to the brackets and rotated by the gears. The spit may have three bars, as shown, or, the same may have four bars, or any desired number of bars, without departing from the invention.

I claim:

1. An improved spit comprising a head, a second head, bars between the heads slidably connected with one of said heads, all arranged distant to the axis of rotation of the heads and circumferentially arranged in respect to the material placed substantially centrally thereof for inclosing the material to be roasted, said bars surrounding the material to be roasted and being slidable in respect to at least one of said heads.

2. A rotary spit comprising a head, a closing head having holes, bars secured in said first-named head and engaging in the holes of the closing head, a shaft connected with said first-named head, and a trunnion pivoted to said closing head.

3. A rotary spit comprising a head, a closing head having holes, bars spaced apart and secured in said first-named head and engaging in the holes of the closing head, a shaft integral with said first-named head, and having a bevel-gear thereon, and a trunnion pivoted to said closing head and having an annular groove.

4. The combination with bearings spaced apart, and means for supporting the same at opposite sides of a broiler-fire, one of said bearings having a screw, and the other of said bearings having a removable cap, of a spit comprising a head, a supporting-member, spaced food-supporting bars carried by said head and detachably engaging said supporting-member, a shaft secured to the head, and provided with driving means, and a trunnion secured to the supporting-member and having an annular groove engaged by said screw.

In testimony, that I claim the foregoing as my invention, I have signed my name in presence of two subscribing witnesses.

LOUIS HENRY RAILLERE.

Witnesses:
JOHN MURTAGH,
GRACE LANE.

---

Copies of this patent may be obtained for five cents each, by addressing the "Commissioner of Patents, Washington, D. C."